US008999165B2

(12) United States Patent
Sperandio et al.

(10) Patent No.: US 8,999,165 B2
(45) Date of Patent: Apr. 7, 2015

(54) METHOD FOR THE BIOLOGICAL TREATMENT OF WASTEWATER USING AN AEROBIC GRANULAR BIOMASS

(75) Inventors: Mathieu Sperandio, Venerque (FR); Angela Manas-Llamas, Valladolid (ES); Francois Decker, Quint Fonsegrives (FR); Beatrice Biscans, Escalquens (FR)

(73) Assignees: Valbio, Portet sur Garonne (FR); Inst National des Sciences Appliquees de Toulouse, Toulouse (FR)

( * ) Notice: Subject to any disclaimer, the term of this patent is extended or adjusted under 35 U.S.C. 154(b) by 121 days.

(21) Appl. No.: 13/979,695

(22) PCT Filed: Jan. 18, 2012

(86) PCT No.: PCT/EP2012/050740
§ 371 (c)(1),
(2), (4) Date: Aug. 8, 2013

(87) PCT Pub. No.: WO2012/098171
PCT Pub. Date: Jul. 26, 2012

(65) Prior Publication Data
US 2013/0319936 A1     Dec. 5, 2013

(30) Foreign Application Priority Data
Jan. 20, 2011 (FR) .................................. 11 50469

(51) Int. Cl.
*C02F 3/30*      (2006.01)
*C02F 3/12*      (2006.01)
*C02F 101/10*    (2006.01)

(52) U.S. Cl.
CPC .............. *C02F 3/308* (2013.01); *C02F 3/1263* (2013.01); *C02F 3/301* (2013.01); *C02F 2101/105* (2013.01); *Y10S 210/906* (2013.01)

(58) Field of Classification Search
CPC ........ C02F 3/308; C02F 3/1263; C02F 3/301; C02F 2101/105
USPC .................................. 210/605, 630, 631, 906
See application file for complete search history.

(56) References Cited

U.S. PATENT DOCUMENTS

| 4,431,543 A | 2/1984 | Matsuo et al. |
| 4,917,802 A | 4/1990 | Fukaya et al. |

(Continued)

FOREIGN PATENT DOCUMENTS

| CN | 101468849 | 7/2009 |
| FR | 2 503 690 | 10/1982 |

(Continued)

OTHER PUBLICATIONS

International Search Report dated Sep. 4, 2012, corresponding to PCT/EP2012/050740.

(Continued)

*Primary Examiner* — Fred Prince
(74) *Attorney, Agent, or Firm* — Young & Thompson

(57) ABSTRACT

A method for the biological treatment of wastewater containing pollutants, using an aerobic biomass, includes a plurality of successive cycles of a predefined duration in order to achieve pollutants removal efficiency of 90% or higher, each of the cycles including the following steps: —introducing a wastewater effluent containing phosphorus and calcium into a reactor containing biomass; —applying an aerobic phase by introducing into the reactor a gas flow containing oxygen for a predefined length of time, sufficient to form aerobic biomass granules; —decanting the aerobic biomass granules thus formed; —and removing at least part of the treated effluent. After each step of introducing effluent into the reactor, the pH in the reactor is maintained at a value above 8 for a length of time at least equal to 10% of the cycle duration.

10 Claims, 5 Drawing Sheets

(56) References Cited

U.S. PATENT DOCUMENTS 6,566,119 B1 * 5/2003 Heijnen et al. ................ 435/243
6,793,822 B2 9/2004 Tay et al.

FOREIGN PATENT DOCUMENTS

JP          2005 238166           9/2005
WO          WO 2008-141413 A1 *  11/2008

OTHER PUBLICATIONS

Database WPI Week 200947; Thomson Scientific, London, GB; AN 2009-L35281; XP002661122, CN 101 468 849; Jul. 1, 2009.

* cited by examiner

METHOD FOR THE BIOLOGICAL TREATMENT OF WASTEWATER USING AN AEROBIC GRANULAR BIOMASS

This invention belongs to the field of wastewater purification. More specifically, it relates to a method for the biological treatment of wastewater using an aerobic biomass that in particular ensures the removal of phosphorus contained in this water. The invention also relates to a method for obtaining a stable source of calcium phosphate, i.e. hydroxyapatite, from wastewater containing phosphorus, which implements the steps of this wastewater treatment method. In addition, the invention concerns aerobic biomass granules obtained by utilizing such a method, as well as the use of such granules as fertilizers.

Wastewater, in particular that coming from industries in the agri-food sector, is a significant source of environmental pollution. This is in particular the case for wastewater containing large quantities of phosphorus, such as is often generated for example by the dairy processing industry. Such wastewater is likely to cause serious eutrophication problems in lakes, rivers and oceans.

Currently, the phosphorus contained in wastewater is removed by physicochemical methods, by means of metal salts such as iron or aluminum salts that cause the physico-chemical precipitation of the phosphorus. However, firstly, such methods are costly and secondly, these metal salts are pollutants. These methods, which produce sludge heavily loaded with polluting metal elements, therefore produce no environmental benefit.

Other methods of removing the phosphorus contained in wastewater have been proposed in the prior art, which remedy these drawbacks. These biological-type methods, called EBPR (Enhanced Biological Phosphorus Removal), utilize floccular sludge and take advantage of intracellular phosphorus overaccumulation phenomena to achieve the removal of phosphorus contained in effluent. However, these methods have a low purification yield. In addition, the phosphorus accumulates within the flocs in an unstable form, which makes it impossible to reuse.

Aerobic biomass granule formation methods for wastewater treatment are also known. These methods comprise the following successive steps, performed repeatedly: introducing wastewater effluent into a reactor containing biomass, applying aerobic conditions within this reactor, then decanting the aerobic biomass granules thus formed and removing part of the treated effluent. Examples of such methods are in particular described in U.S. Pat. No. 6,566,119 and U.S. Pat. No. 6,793,822.

This invention aims to remedy the drawbacks of existing wastewater treatment methods, in particular those mentioned above, by proposing a treatment method for wastewater containing phosphorus that makes it possible to remove the latter efficiently, at the same time as all the other pollutants contained therein, while being less costly to carry out than the methods of the prior art and having few adverse environmental effects. Another aim of the invention is for this method to enable the phosphorus thus removed from the wastewater to be easily recovered in a stable form, for later use At the origins of the invention, the present inventors discovered that a biological method utilizing an aerobic biomass, applied to wastewater containing a large amount of phosphorus, when realized in specific operating conditions, makes it possible to produce aerobic biomass granules with mineral phosphate crystals trapped in their cores.

The inventors took advantage of these observations to propose a biological wastewater treatment method making it possible both to achieve a high removal efficiency of pollutants contained therein, of phosphorus in particular, and to produce stable biomass granules that are rich in mineral phosphate and reusable.

According to the invention, a method for the biological treatment, using an aerobic biomass, of wastewater containing pollutants, in particular phosphorus, nitrogen and organic pollutants, in order to purify said wastewater, comprises a plurality of successive cycles of a predefined duration in order to achieve a pollutants removal efficiency of 90% or higher, each of said cycles comprising the following steps:
  introducing a wastewater effluent containing phosphorus and calcium in determined respective concentrations, into a reactor containing biomass;
  applying an aerobic phase by introducing into the reactor a gas flow containing oxygen for a predefined length of time, sufficient to form aerobic biomass granules in the reactor;
  decanting the aerobic biomass granules thus formed;
  and removing at least part of the treated effluent.

This method is characterized in that, after each step of introducing effluent into the reactor, the aerobic phase is preceded by a phase in anoxic conditions and in addition the pH in the reactor is maintained at a value above 8 for a length of time at least equal to 10% of the cycle duration.

"Aerobic biomass" means, in a conventional manner, a set of heterotrophic and/or autotrophic bacteria that are able to multiply and degrade substrates by consuming oxygen.

The biomass contained in the reactor into which the effluent is introduced can either be in granular form, in particular during normal operation of the reactor, or in non-granular form, at start-up, i.e. when the reactor is first put in operation.

The duration of the cycle, making it possible to achieve a removal efficiency of 90% or higher for pollutants contained in the effluent, can easily be defined by the person skilled in the art, depending in particular on the concentration of pollutants in the effluent.

Such operating conditions according to the invention advantageously induce the precipitation of a large amount of phosphorus in the core of the granules formed in the reactor, in the form of calcium phosphate and mainly of hydroxyapatite $Ca_5(PO_4)_3(OH)$. In particular, they cause a large increase in the amount of intracellular phosphorus, and the crystallization of the latter in the form of hydroxyapatite in the core of the aerobic biomass granules that form within the reactor.

The phase in anoxic conditions can, for example, be realized by simple stirring without aeration or by introducing a gaseous nitrogen flow into the reactor, this introduction realizing in addition the mixture of the effluent and the biomass inside the reactor. Preferably, it is realized by recirculating a liquid flow collected in an upper portion of the reactor and reinjected in a lower portion of the reactor.

Preferably, in operating conditions of the method according to the invention that are suitable for ensuring depollution of wastewater such as that frequently produced by industries in the agri-food sector, the pH is maintained at a value above 8 for at least 10 minutes, preferably for at least 20 minutes.

The phosphate thus formed in the core of the granules constitutes a mineral support for bacteria, such that the granules obtained are dense and have, in particular, advantageous properties in terms of stability and decantation capacity. Many advantages stem from this, in particular, faster and better separation of the granules from the treated water during the decantation phase, the ability to use larger biomass loads in the reactor for the same volume in use and, consequently, to increase the volume of wastewater treated in each operation, etc. Thus, for example, a biomass concentration as high as 30 g/l can be used in the reactor.

The method according to the invention turns out, in addition, to require lower capital investment and operating costs than the methods of the prior art. It utilizes no polluting metal salt and thereby takes part in reducing the environmental footprint of a more global wastewater treatment industry in which it can be incorporated.

The biomass granules obtained, in the core of which the calcium phosphate has accumulated, advantageously constitute a solid product that is easy to dehydrate, easy to stock and reusable, particularly in the farming sector. In this, the method according to the invention, as well as ensuring the purification of wastewater containing phosphorus, provides a solution to a current problem of depletion of the geological phosphate resources, since the biomass granules formed in the reactor can be used as a source of calcium phosphate, after a suitable treatment.

To this end, in preferred modes of implementation of the invention, the treatment method comprises for at least one of the cycles a step of recovering aerobic biomass granules after the decantation step.

The wastewater effluent to which the invention applies can be of any type. Wastewater from the agri-food industry typically contains various organic, nitrogenated and phosphorated pollutants. When the effluent does not naturally comprise calcium salts, calcium is added therein before or at the time it is introduced into the reactor.

In preferred modes of implementation of the invention, the concentration of calcium in the effluent is adjusted so as to obtain a calcium/phosphorus molar ratio equal to or greater than 1 and preferably equal to or greater than 1.7. Depending on the characteristics of the specific effluent to be treated, such a concentration of calcium can possibly be obtained by adding calcium salts to the effluent before or at the time it is introduced into the reactor. This advantageously promotes the precipitation of a large amount of the phosphorus present in the effluent in the core of the granules, in the form of hydroxyapatite crystals.

In addition, the biomass initially introduced into the reactor is preferably chosen so that it contains a wide range of microorganism types. The bacteria best suited to the specific effluent to which they are subsequently subjected develop and multiply naturally therein, whereas the others disappear progressively.

In preferred modes of implementation of the invention, the pH in the reactor is maintained at a value below 9 during said length of time at least equal to 10% of the cycle duration.

A pH range of 8 to 9 is especially advantageous, in that it ensures the precipitation of calcium phosphate in the form of hydroxyapatite in the core of the granules forming in the reactor In addition, even though such a pH range may not be optimum for the metabolism of most bacterial strains, it can be seen that such operating conditions advantageously do not disrupt this metabolism.

In preferred modes of implementation of the invention, nitrates are also added in the effluent, in an amount proportional to the Chemical Oxygen Demand of the latter and suitable to obtain in the effluent a nitrogen/Chemical Oxygen Demand mass ratio of between 1/10 and 1/4, before or at the time it is introduced into the reactor. By optimizing the denitrification reactions occurring at the biomass granules, these nitrates advantageously make it possible to better control the pH at the very core of these granules, thus ensuring better control of the phosphorus precipitation inside them, as well as of the mineral form of the precipitate thus obtained.

Here, the Chemical Oxygen Demand (COD) is defined in conventional way, i.e. as representing the amount of oxygen, expressed in mg $O_2$/liter $H_2O$, required to oxidize all the organic matter contained in the liquid medium.

Keeping the pH within a range of values consistent with the invention can be achieved by any conventional means, e.g. by adding into the reactor acid or alkali reagents, depending on the requirements, and/or by adjusting various operating parameters, such as the flow rate of the gas flow and the length of the aerobic phase and/or the length of the phase in anoxic conditions and/or by adding nitrates to the effluent, etc.

In practice, the inventors noted that a suitable initial setting of the operating parameters made it possible to maintain the pH within the correct value range for the length of time recommended by this invention and thereby to obtain a large and controlled precipitation of the phosphorus, in the mineral form of hydroxyapatite, with no need to add acid or alkali reagents in the reactor.

In modes of implementation of the invention, the pH in the reactor is adjusted when necessary by modulating the flow rate of the gas flow containing oxygen during said aerobic phase.

The chemical and biological mechanisms underpinning the formation of a calcium phosphate precipitate in the biomass granules will not be expounded here, as these mechanisms are relatively complex. However, the present inventors observed that alternating anoxic and aerobic phases within the reactor, which induces denitrification and nitrification reactions catalyzed by denitrifying and nitrifying bacteria proliferating in the latter in the presence of a carbonated source present in the wastewater, takes part in creating conditions within the reactor favorable to a precipitation of the calcium phosphate in the core of the biomass granules in a highly concentrated way. This calcium phosphate, which is immobilized within the biomass granules during all the steps of manipulating the latter, is then advantageously easier to recover at the end of the method.

In general, wastewater, whose depollution the method according to the invention is designed to be applied to, contains organic and nitrogenated pollutants, such as ammonia and nitrates, in addition to phosphorated pollutants. A treatment method matching one or more of the features recommended by this invention advantageously makes it possible to obtain in a single step a high carbon, nitrogen and phosphorus simultaneous removal efficiency from the effluent. At the end of the treatment, the effluent is ready to be discharged safely into the environment.

Another aspect of the invention is a method for obtaining a source of calcium phosphate from wastewater containing phosphorus, comprising:
  implementing a method for the biological treatment of wastewater having one or more of the features described above;
  recovering aerobic biomass granules formed in the reactor;
  and dehydrating these granules.

Where applicable, these steps are followed by a step of extracting the calcium phosphate contained in the granules.

Within the framework of a wastewater treatment method utilizing a plurality of successive cycles of supplying the reactor with effluent, treating the latter with the microorganisms forming the biomass in aerobic conditions, decanting and removing the effluent, the recovery of the granules can be performed at a variable frequency depending on the concentration of phosphorus in the treated effluent.

These stable and easily dehydratable granules advantageously constitute a reusable source of calcium phosphate, in particular in the farming sector.

Thus, another aspect of the invention are aerobic biomass granules obtained by a method having the features cited above, which are characterized by a core containing calcium phosphate in the form of hydroxyapatite.

Another aspect of the invention is the use of such aerobic biomass granules, whose core contains hydroxyapatite, as fertilizers.

The invention will now be described more precisely in the context of the preferred implementation example below, which is in no way limiting, referring to FIGS. 1 to 8, wherein.

Figure 7:
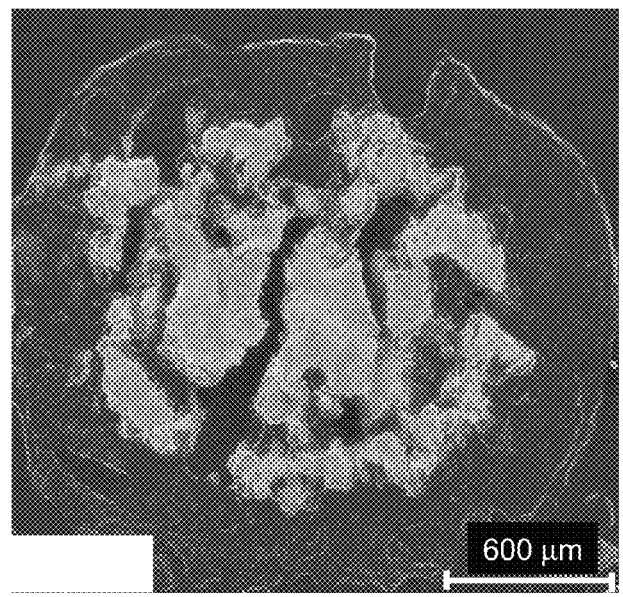
FIG. 7 shows a scanning electron microscopy image of a central slice of a granule obtained in the reactor after running a wastewater treatment method according to the invention.
Figure 8:
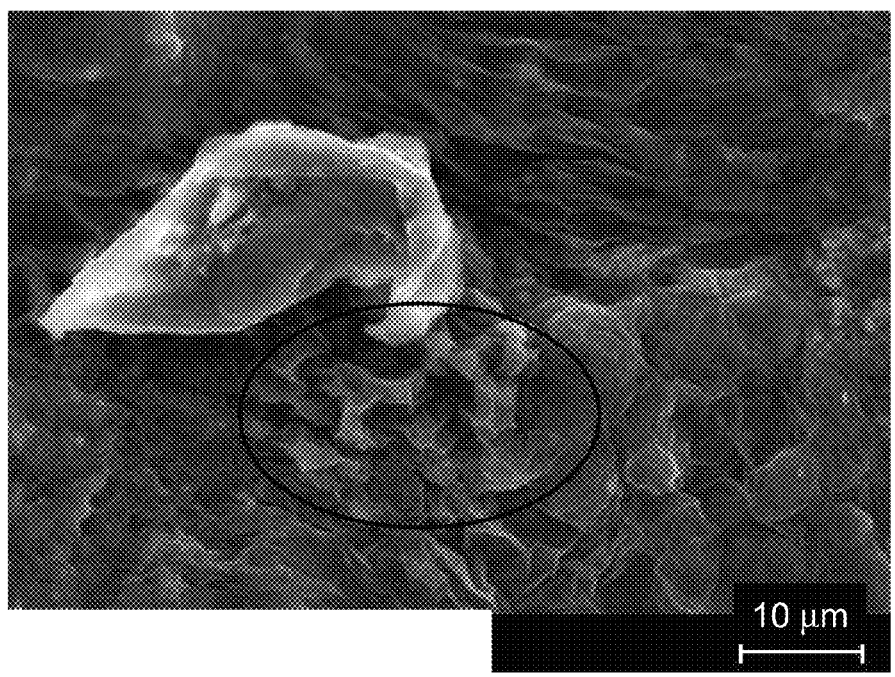

and FIG. 8 shows an enlargement of a detail of the image in FIG. 7.

Wastewater Treatment Method

An example of a method according to the invention for the treatment of wastewater comprising various pollutants, organic, nitrogenated and phosphorated in particular, is implemented as follows.

Aerobic biomass granules are cultivated, at an initial concentration of 2.8 g COD/l, in a conventional column-type reactor with an operating capacity of 17 l, a diameter of 15 cm, a height/diameter ratio equal to 7 and an 83 cm long, 15 cm wide deflector plate.

A 3 mm-diameter fine bubble diffuser is inserted in the bottom of the reactor, on one side of the deflector plate. This diffuser performs the mixing of effluent and biomass within the reactor, by diffusing gaseous nitrogen therein for the anoxic phases and air for the aerobic phases. Gas flows of 160, 250 or 350 N l/h are applied.

The temperature is kept at a constant value of 20° C. by means of a water-circulation sleeve placed around the reactor, during all the steps of the method.

A synthetic effluent with the following composition is used:

| Chemical Oxygen Demand (COD) 1000 mg/l (contribution of 25% glucose, acetate, propionic acid and ethanol) | |
|---|---|
| $PO_4^{3-}$ | 30 mg P/l |
| $Ca^{2+}$ | 46 mg/l |
| $CO_3^{2-}$ | 100 mg/l |
| $MgSO_4, 7H_2O$ | 12 mg/l |
| $NH_4^+$ | 50 mg N/L |
| $NO_3^-$ | 100 mg N/l |

The calcium/phosphorus molar ratio in this effluent is equal to 1.18.

Successive treatment cycles are utilized as follows:
8 l of the synthetic effluent are introduced into the reactor, through the latter's bottom, for a duration of 15 minutes;
anoxic conditions are applied by diffusing gaseous nitrogen into the reactor for 20 minutes;
aerobic conditions are applied by diffusing air into the reactor for 145 minutes;
the sludge in the reactor is left to decant by stopping all gas injections into the reactor for 30 minutes;
then a volume of 8 l of effluent is removed from the reactor for 30 minutes.

The hydraulic retention time is set to 8.5 hours, with a volumetric exchange ratio of 50%.

The total duration of each cycle is equal to 240 minutes.

After each step of introducing effluent into the reactor, the pH is kept at a value of between 8 and 9 for at least 24 minutes.

The total run duration of the method comprising the successive cycles described above is 720 days.

The oxygen concentration and pH in the reactor are measured continuously by means of selective probes inserted into the reactor, these probes being conventional.

When the value of the pH is seen to fall below 8 or rise above 9, the pH is adjusted so as to bring it back with the 8-9 range, for example by modulating the gaseous nitrogen flow during the anoxic phase and/or by modulating the air flow during the aerobic phase.

Characterization of the Liquid and Solid Phases within the Reactor while the Method is Running Samples of total sludge are collected from the reactor at regular intervals and subjected to the following analyses:

Chemical Analyses

The chemical analyses are performed according to standard methods compliant with the AFNOR, 1994 standards for COD (NFT 90-101), solids in suspension in the mixed liquor (MES) (NFT 90-105) and volatile solids in suspension in the mixed liquor (MVS) (NFT 90-106). Concentrations of $NO_2^-$, $NO_3^-$, $PO_4^{3-}$, $NH_4^+$, $Ca^{2+}$, $K^+$, $Mg^{2+}$ are determined by ion exchange chromatography (NFT 90-023) after a sample has been filtered through acetate filters with 0.2 μm pore size.

At the end of 540 days of running the method, concentrations of MES and MVS of 30-35 g/l and 21-25 g/l respectively are measured. These results reflect a higher biomass concentration than in conventional biological floccular sludge methods. The minerals content (10 g/l) makes up more than 30% of the content of matter in suspension (MES), demonstrating a large precipitation in the aggregates.

Figure 2A:
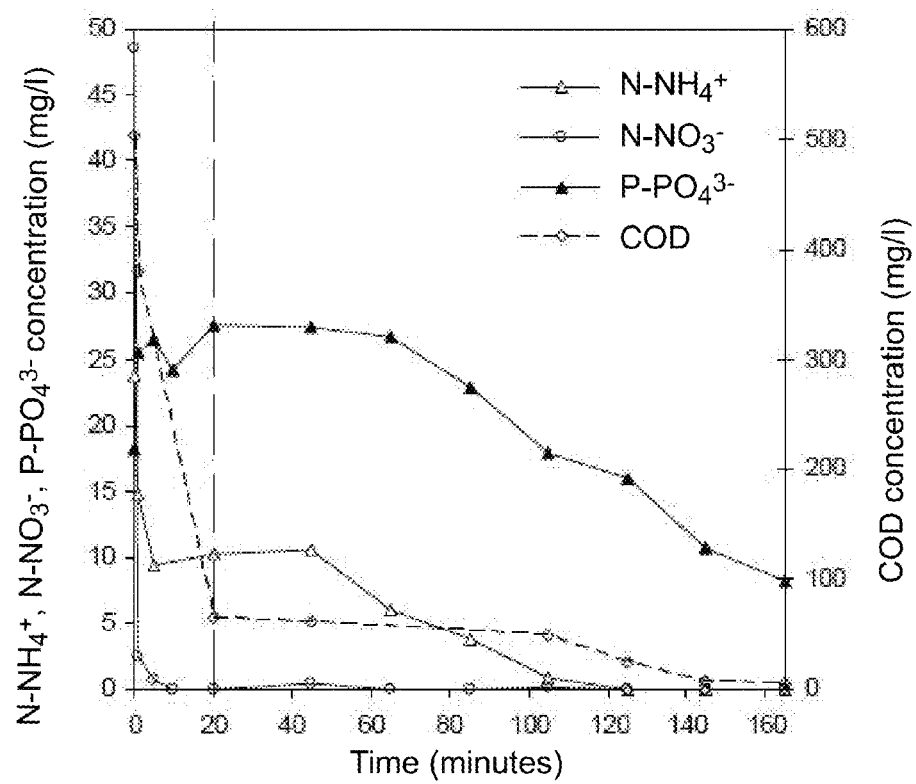
FIG. 2a is a graph showing the changes over time in the $NH_4^+$, $N-NO_3^-$, $P-PO_4^{3-}$ and COD concentrations in samples collected from the reactor, at various intervals in a treatment cycle of a method according to the invention, for an aerating gas flow rate of 160 l/h.
Figure 2B:
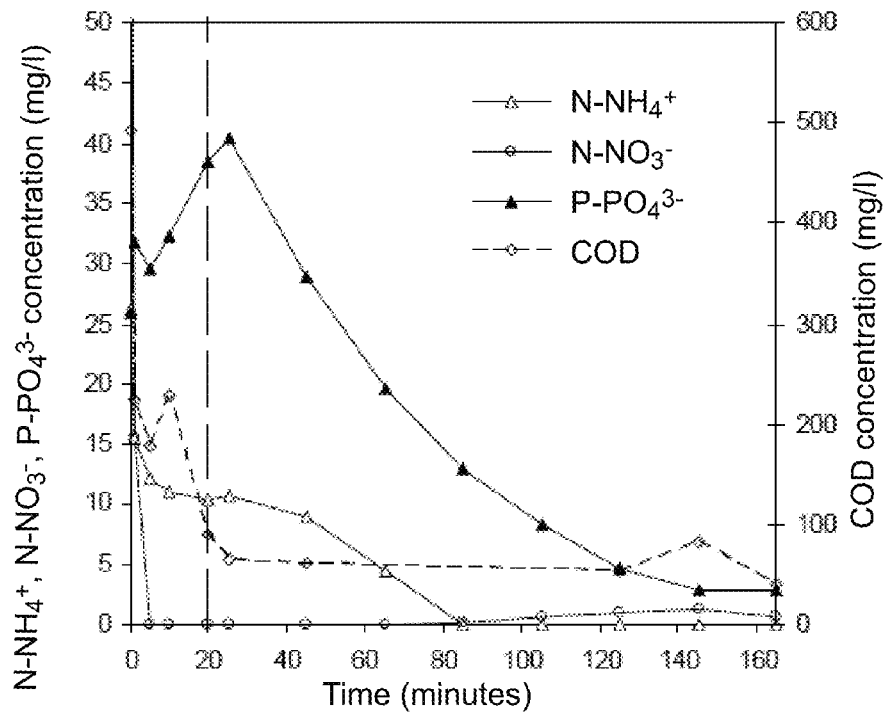
FIG. 2b is a graph showing the changes over time in the $NH_4^+$, $N-NO_3^-$, $P-PO_4^{3-}$ and COD concentrations in samples collected from the reactor, at various intervals in a treatment cycle of a method according to the invention, for an aerating gas flow rate of 350 l/h.
Figure 3:
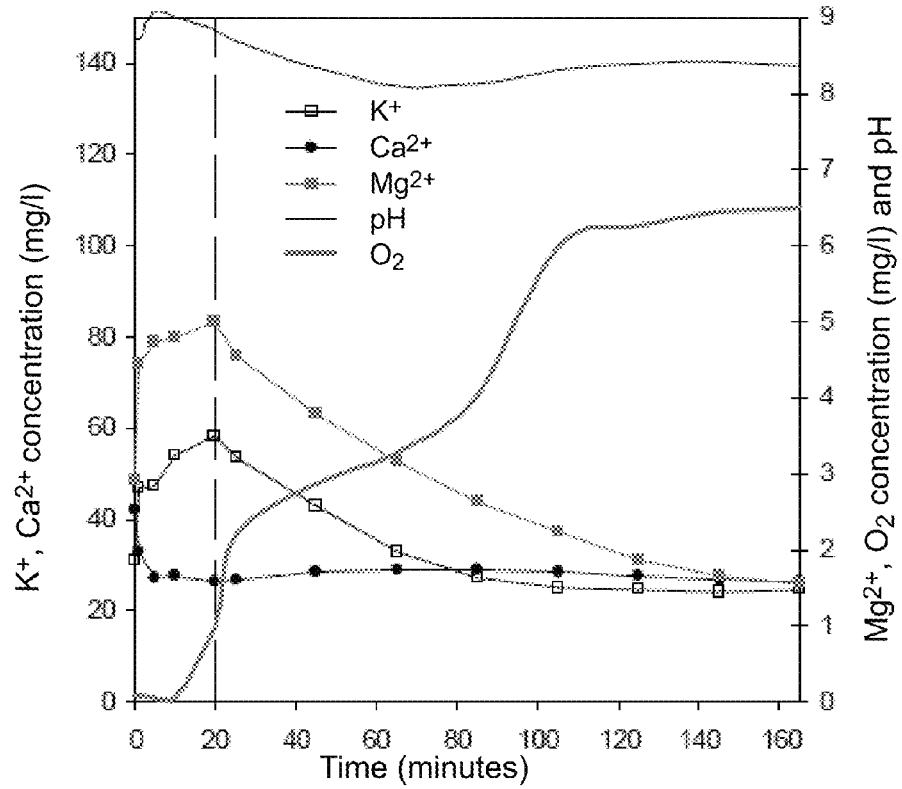
FIG. 3 is a graph showing the changes over time in the potassium $K^+$, calcium $Ca^{2+}$, magnesium $Mg^{2+}$, oxygen $O_2$ concentrations and in the pH in samples collected from the reactor, at various intervals in a treatment cycle of a method according to the invention, for an aerating gas flow rate of 350 l/h.

Kinetic analyses are realized on samples of total sludge collected at regular intervals during a treatment cycle so as to estimate the removal rates for ammonium, nitrate, COD and phosphates initially contained in the effluent. FIGS. 2a and 2b illustrate the changes over time in the ammonium $NH_4^+$, $N-NO_3^-$, $P-PO_4^{3-}$ and COD concentrations, for respective aeration gas flows of 160 l/h and 350 l/h. FIG. 3 illustrates the changes over time in the potassium $K^+$, calcium $Ca^{2+}$, magnesium $Mg^{2+}$, oxygen $O_2$ concentrations and the pH, for an aeration gas flow of 350 l/h. In these figures, the separation between the anoxic and aerobic phases is illustrated by a vertical dotted line.

The removal rates observed at the end of 540 days of running the method are 100% for ammonium, 100% for nitrates, 82% for orthophosphates and 99% for soluble CODs. These rates clearly show an efficient purification of the effluent, both for carbonated matter and for nitrogenated matter and phosphates. This purification was realized simultaneously for all the pollutants by a single method.

It can also be seen that for an aeration gas flow of 350 l/h, the pH remains above 8 for the entire duration of the cycle.

Microscopic Observations

Microscopic observations of total sludge samples collected from the reactor after various run durations of the treatment method are realized by means of a BiomedLitz® binocular photonic microscope.

Figure 1:
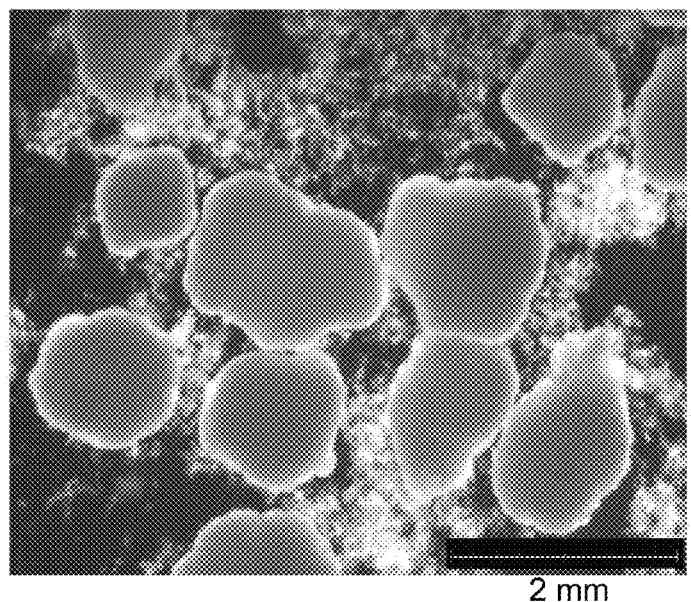
FIG. 1 shows a micrograph obtained for a sample of total sludge collected from the reactor after implementing a wastewater treatment method according to the invention.

An example of micrography obtained in this way for a sample collected after 520 days of running the method is given in FIG. 1. It can be seen there that the mixed liquor contained in the reactor is made up mainly of granules and of a low proportion of flocs, the latter disappearing progressively in step with the collections over time.

A Malvern 2000 Mastersizer® analyzer is used to measure the particle size distribution. It shows that after 420 days of treatment, the average diameter of the granules is 800 µm.

So as to analyze their internal structure, the granules are cut into fine slices 100 µm thick, using a Leica CM 30505 Kryostat® cryomicrotome.

Figure 4:
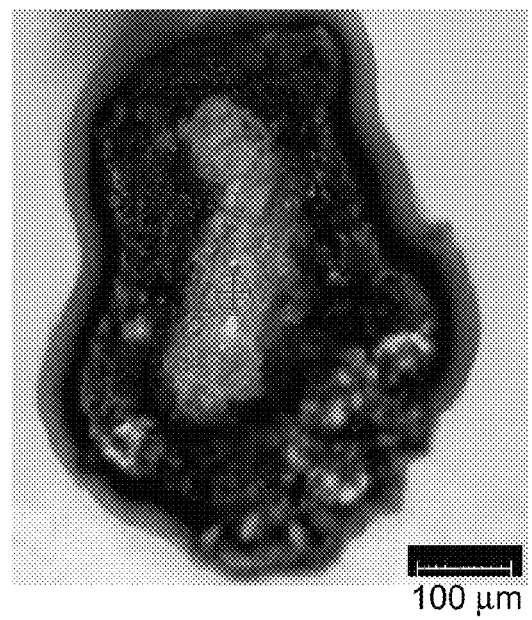
FIG. 4 shows a micrograph of a central slice of a granule obtained in the reactor after implementing a wastewater treatment method according to the invention.

FIG. 4 shows a central slice of a biomass granule obtained after 450 days of running the treatment method, observed through a BiomedLitz® binocular photonic microscope. This observation reveals the presence of a white mineral precipitate concentrated at the center of the granule.

Raman Spectroscopic Analyses

Figure 5:
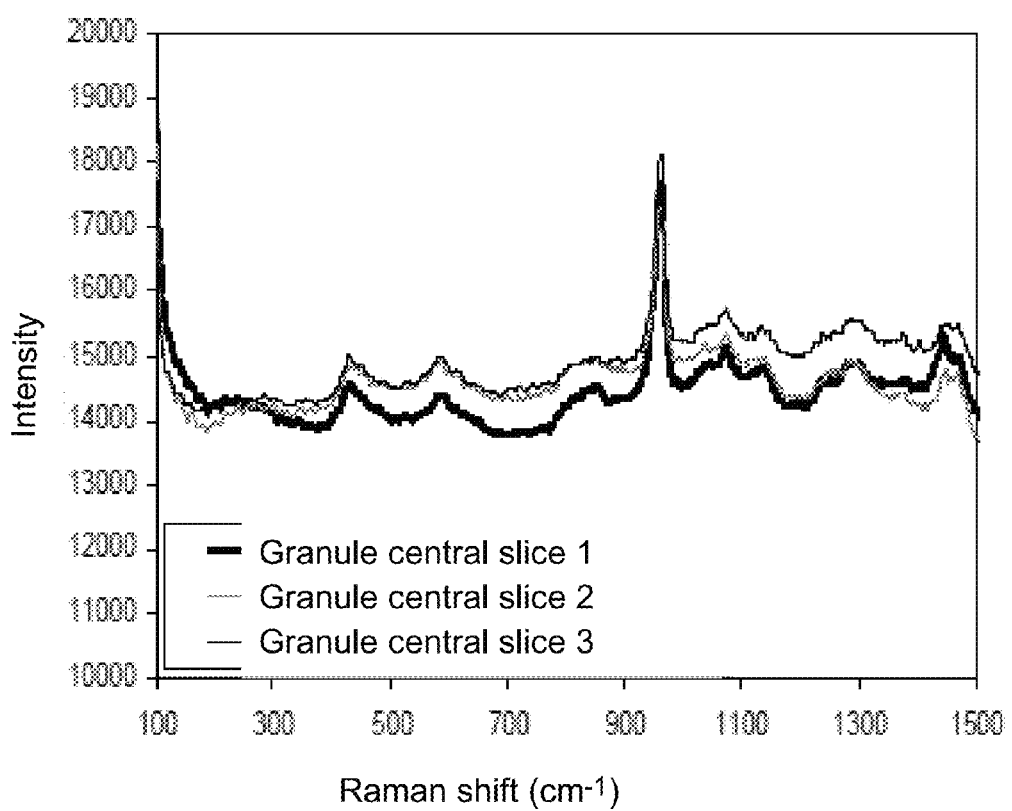
FIG. 5 shows a Raman spectroscopy spectrum for central slices of granules obtained in the reactor after various run durations of a wastewater treatment method according to the invention.

Raman spectroscopic analyses are performed on central slices of granules, at a 785 nm wavelength in the visible spectrum. Two different optic fibers are used for the incident beam (50 µm) and the collector beam (100 µm). FIG. 5 shows an example of a spectrum for three central slices of granules obtained after, respectively, 390 (central slice 1), 420 (central slice 2) and 450 (central slice 3) days of running the method.

It can be seen that all the slices show the same peaks, irrespective of the collection time. The largest peaks observed on these spectra are associated with Raman shifts of 430, 588, 850, 962, 1072, 1135, 1295 and 1448 $cm^{-1}$.

Figure 6:
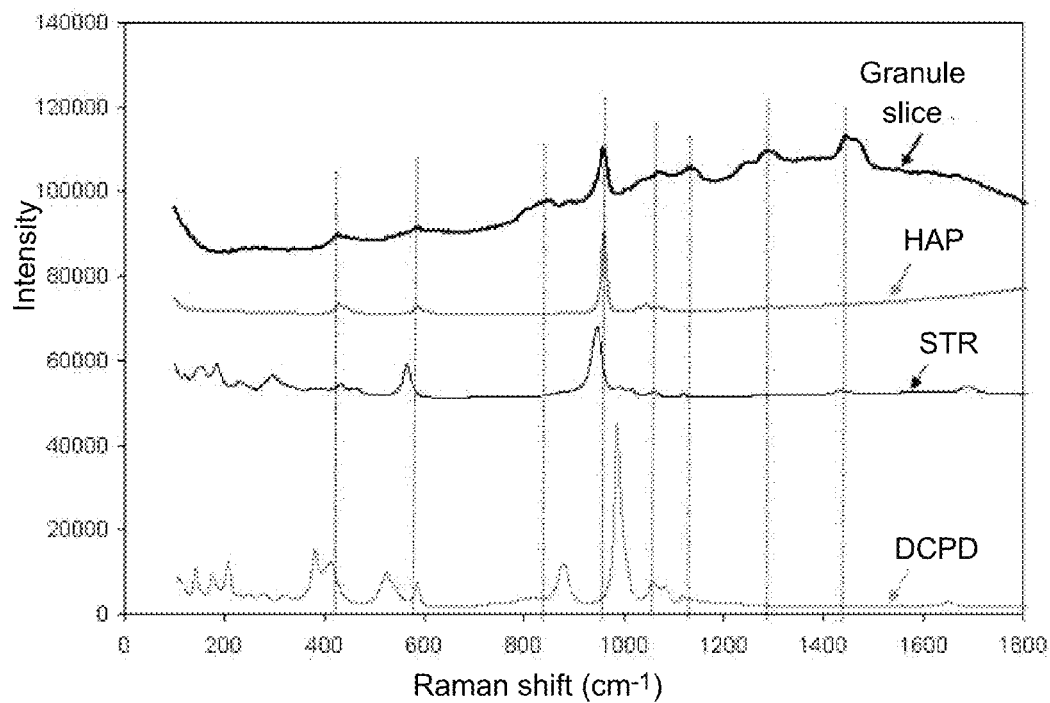
FIG. 6 shows Raman spectroscopy spectra for a central slice of a granule obtained in the reactor after running a wastewater treatment method according to the invention, as well as for hydroxyapatite HAP, struvite STR and brushite DCPD.

These spectra are compared to reference spectra obtained for various mineral phosphates, i.e. hydroxyapatite HAP, struvite STR and brushite DCPD. FIG. 6 shows the reference Raman spectra for the minerals cited above, as well as the Raman spectrum for central slice 1.

In it, it can be seen that among the reference minerals, hydroxyapatite has the closest profile to that of the granule slice, both for intensity and wave number. The reference spectrum for hydroxyapatite has, in effect, four peaks corresponding to those of the granule slice (427, 589, 962, 1072 $cm^{-1}$). This result proves that hydroxyapatite is the main form of calcium phosphate present in the form of precipitate inside the granules.

Scanning Electron Microscopy and Energy Dispersive X-Ray Analyses

Prior to the energy dispersive X-ray (EDX) analysis, the granules are cut into fine slices 100 µm thick, using a Leica CM 30505 Kryostat® cryomicrotome.

The energy dispersive X-ray (EDX) analysis was performed by means of an X photon analyzer, with a 127 eV detection limit. This analyzer is coupled to a scanning electron microscope operating in a low-pressure chamber.

FIG. 7 shows an image obtained by scanning electron microscopy of a central slice of a granule collected at the end of the aerobic phase after 711 days of treatment. In it, a lighter central portion can clearly be seen, corresponding to the granule's mineral core, surrounded by a darker portion, corresponding to the organic matrix.

The coupled energy dispersive X-ray analysis reveals that calcium and phosphorus are the main elements found together in the precipitates at the center of the granules. These elements can only be found in trace amounts in the organic envelope. This result proves clearly that calcium phosphate is concentrated at the core of the biomass granules.

On higher-resolution images, as shown in FIG. 8, prismatic structures similar to those of hydroxyapatite can also be seen.

A quantitative analysis performed on five different samples also shows the Ca/P atomic ratio obtained for the mineral precipitate found at the center of the granules is equal to 1.63±0.05, and relatively close to the theoretical ratio for hydroxyapatite, which is 1.67.

Parallel analyses performed on the flocs and the supernatant show no significant amount of calcium phosphate. Consequently, the latter is truly concentrated inside the granules when the treatment method according to the invention is utilized.

X-Ray Diffraction Analysis

Prior to the X-ray diffraction (XRD) analysis, the granules are dried and burned in an oven at 500° C. for 2 hours, so as to remove the organic fraction therefrom.

The X-ray diffraction analysis is performed by means of a Brucker® D5000 diffractometer comprising a tube of cobalt diffusing from 4 to 70° in 2θ.

Samples of granules obtained after various run durations of the method according to the invention are analyzed and the diffractograms obtained are compared to the reference spectrum of hydroxyapatite. The results obtained are consistent with a preponderance of calcium phosphate in the granules mainly in the form of hydroxyapatite.

The results of the analyses above clearly prove that:
the method according to the invention for the biological treatment of wastewater makes it possible to remove simultaneously and efficiently organic, nitrogenated and phosphorated pollutants;
the operating conditions according to the invention, in particular in terms of the pH being maintained inside the reactor, lead to the formation of a calcium phosphate mineral precipitate, mainly in the form of hydroxyapatite, in a concentrated manner inside the biomass granules.

At the end of this wastewater treatment method, the biomass granules obtained can be recovered, then dehydrated, and constitute a reusable source of calcium phosphate.

In addition, these granules are dense and stable, such that in particular they make possible reactor biomass loadings as high as 30 g/l.

The method according to the invention is advantageously less costly to utilize than the methods proposed by the prior art and requires no polluting additive to be used.

The above description clearly illustrates that through its various features and their advantages the present invention realizes the objectives it set itself. In particular, it proposes a biological wastewater treatment method using an aerobic granular biomass, which makes it possible to remove organic, nitrogenated and phosphorated pollutants simultaneously, with high yields and to produce reusable stable biomass aggregates rich in mineral phosphate.

The invention claimed is:

1. A method for the biological treatment of wastewater containing pollutants, using an aerobic biomass, comprising a plurality of successive cycles of a predefined duration in order to achieve pollutants removal efficiency of 90% or higher, each of said cycles comprising the following steps:
   introducing a wastewater effluent containing phosphorus and calcium in determined respective concentrations, into a reactor containing biomass;
   applying an aerobic phase by introducing into said reactor a gas flow containing oxygen for a predefined length of time, sufficient to form aerobic biomass granules in the reactor;
   decanting the aerobic biomass granules thus formed;
   and removing at least part of the treated effluent,
   characterized in that, after each step of introducing effluent into the reactor, the aerobic phase is preceded by a phase in anoxic conditions and the pH in said reactor is maintained at a value above 8 for a length of time at least equal to 10% of the cycle duration.

2. The treatment method according to claim 1, whereby the pH in said reactor is maintained at a value below 9 during said length of time.

3. The treatment method according to claim 1, whereby the concentration of calcium in the effluent is adjusted so as to obtain a calcium/phosphorus molar ratio equal to or greater than 1.

4. The treatment method according to claim 3, whereby the concentration of calcium in the effluent is adjusted so as to obtain a calcium/phosphorus molar ratio equal to or greater than 1.7.

5. The treatment method according to claim 1, whereby the pH in the reactor is adjusted by modulating the flow rate of the gas flow containing oxygen during said aerobic phase.

6. The treatment method according to claim 1, whereby the phase in anoxic conditions is realized by recirculating a liquid flow collected in an upper portion of the reactor and reinjected in a lower portion of the reactor.

7. The treatment method according to claim 1, whereby nitrates are added in the effluent, in an amount suitable to obtain therein a nitrogen/Chemical Oxygen Demand mass ratio of between 1/10 and 1/4.

8. The treatment method according to claim 1, comprising for at least one of said cycles a step of recovering aerobic biomass granules after said decantation step.

9. Aerobic biomass granules obtained by a method according to claim 8, whose core contains hydroxyapatite.

10. A method for obtaining a source of calcium phosphate from wastewater containing phosphorus, comprising:
   implementing a method for the biological treatment of wastewater according to claim 1;
   recovering aerobic biomass granules formed in the reactor;
   and dehydrating said granules.

* * * * *